US012725812B2

(12) United States Patent
Ringk et al.

(10) Patent No.: US 12,725,812 B2
(45) Date of Patent: Sep. 1, 2026

(54) DEVICE AND METHOD FOR CLEANING A FLUID FOR THE OPERATION OF A FUEL CELL

(71) Applicant: Robert Bosch GmbH, Stuttgart (DE)

(72) Inventors: Andreas Ringk, Bamberg (DE); Anton Ringel, Bamberg (DE)

(73) Assignee: Robert Bosch GmbH, Stuttgart (DE)

( * ) Notice: Subject to any disclaimer, the term of this patent is extended or adjusted under 35 U.S.C. 154(b) by 574 days.

(21) Appl. No.: 17/794,482

(22) PCT Filed: Dec. 28, 2020

(86) PCT No.: PCT/EP2020/087911
§ 371 (c)(1),
(2) Date: Jul. 21, 2022

(87) PCT Pub. No.: WO2021/148228
PCT Pub. Date: Jul. 29, 2021

(65) Prior Publication Data
US 2023/0082236 A1 Mar. 16, 2023

(30) Foreign Application Priority Data
Jan. 22, 2020 (DE) ........................ 10 2020 200 674

(51) Int. Cl.
*H01M 8/04082* (2016.01)
*B01D 39/20* (2006.01)
(Continued)

(52) U.S. Cl.
CPC ... *H01M 8/04089* (2013.01); *H01M 8/04201* (2013.01); *H01M 8/0687* (2013.01)

(58) Field of Classification Search
CPC ......... H01M 8/04089; H01M 8/04201; H01M 8/0687; H01M 8/04082; H01M 8/04231;
(Continued)

(56) References Cited

U.S. PATENT DOCUMENTS 4,426,292 A 1/1984 Wernick et al.
5,766,458 A * 6/1998 Sekhar ............... B01D 39/2075 440/12.5
(Continued)

FOREIGN PATENT DOCUMENTS

CN 108031209 A * 5/2018
CN 109400202 A * 3/2019 ......... B01D 39/2093
(Continued)

OTHER PUBLICATIONS

Translation of International Search Report for Application No. PCT/EP2020/087911 dated Apr. 12, 2021 (3 pages).
(Continued)

*Primary Examiner* — Christian Roldan
(74) *Attorney, Agent, or Firm* — Michael Best & Friedrich LLP

(57) ABSTRACT

The present invention relates to a filter unit (100, 301) for filtering a fluid (105) for the operation of a fuel cell. The filter unit (100, 301) comprises at least one filter element (101) filled with a filter material (103) comprising cyclodextrin. The presented invention also relates to a fuel cell system, to the use of cyclodextrin to filter a fluid for the operation of a fuel cell system, and to a method for operating a fuel cell system.

8 Claims, 3 Drawing Sheets

(51) Int. Cl.

| | |
|---|---|
| ***H01M 8/04089*** | (2016.01) |
| ***H01M 8/04223*** | (2016.01) |
| ***H01M 8/0662*** | (2016.01) |
| ***H01M 8/12*** | (2016.01) |

(58) Field of Classification Search

CPC ...... H01M 2008/1293; H01M 8/04164; B01D 39/2093; B01D 2239/0428; Y02E 60/50

USPC .......................................................... 429/429

See application file for complete search history.

(56) References Cited

U.S. PATENT DOCUMENTS

| | | | | |
|---|---|---|---|---|
| 2001/0039879 | A1* | 11/2001 | Chapman | B01D 39/083 96/69 |
| 2004/0149634 | A1 | 8/2004 | Hughes | |
| 2005/0022670 | A1* | 2/2005 | Dallas | B01D 53/74 96/108 |
| 2006/0042468 | A1* | 3/2006 | Smith | B01D 53/02 96/154 |
| 2006/0096456 | A1* | 5/2006 | Schroeter | B60L 50/72 429/513 |
| 2009/0274936 | A1* | 11/2009 | Goldstein | B01D 53/885 423/247 |
| 2010/0154629 | A1 | 6/2010 | Fujitani | |
| 2015/0004502 | A1 | 1/2015 | Keya et al. | |
| 2016/0129383 | A1* | 5/2016 | Volk | F02M 35/02483 96/135 |
| 2018/0261863 | A1* | 9/2018 | Agnew | H01M 8/0662 |
| 2018/0358639 | A1 | 12/2018 | Yajima et al. | |
| 2019/0016605 | A1* | 1/2019 | Kinoshita | B01J 19/088 |

FOREIGN PATENT DOCUMENTS

| | | | |
|---|---|---|---|
| DE | 102014205029 | A1 | 9/2015 |
| DE | 102018114351 | A1 | 1/2019 |
| EP | 2948191 | | 12/2015 |
| JP | 2005216774 | A | 8/2005 |
| JP | 2013209532 | A | 10/2013 |
| JP | 2017226562 | A | 12/2017 |
| WO | 2013145674 | A1 | 10/2013 |

OTHER PUBLICATIONS

Wang et al., “Beta-Cyclodextrin based air filter for high-efficiency filtration of pollution sources”, Journal of Hazardous Materials, 2019, vol. 373, pp. 197-203.

Feng Dan, “Atmospheric Pollution Control Technology,” Metallurgical Industry Press, 2019, p. 114 (3 pages including title page and publication data page).

* cited by examiner 111
113
100
103
101
107
109
105

DEVICE AND METHOD FOR CLEANING A FLUID FOR THE OPERATION OF A FUEL CELL

BACKGROUND OF THE INVENTION

Fuel cells, such as solid oxide fuel cells, convert chemical energy into electrical energy in a reaction of hydrogen and oxygen with a characteristic degree of efficiency.

It is known that hydrogen can be stored and released again in large quantities, for example by means of liquid organic hydrogen carriers. A quantity of hydrogen released from a liquid organic hydrogen carrier may contain non-polar organic impurities such as carbon monoxides or hydrocarbons. Such impurities can damage a catalyst of a fuel cell and reduce the efficiency or performance of the fuel cell.

Accordingly, operation of fuel cells with pure hydrogen or hydrogen that is essentially free of impurities is particularly advantageous.

SUMMARY OF THE INVENTION

In the context of the presented invention, a filter unit, a fuel cell system and a method for operating a fuel cell system are presented. Features and details described in connection with the fuel cell system according to the invention naturally also apply in connection with the method according to the invention for operating a fuel cell system and vice versa in each case, so that reference is or can always be made mutually to the individual aspects of the invention with regard to the disclosure.

The invention presented serves in particular to provide a fluid that is optimized for efficient operation of a fuel cell system.

Thus, in a first aspect of the presented invention, a filter unit for filtering a fluid for operating a fuel cell is presented. The filter unit includes at least one filter element filled with a filter material that includes cyclodextrin.

In the context of the presented invention, filtering of a fluid is to be understood as a process in which impurities, such as hydrocarbons, carbon monoxides or other organic substances are at least partially removed from a contaminated fluid.

In context, a fluid is to be understood as meaning an operating fluid for operating a fuel cell, which comprises hydrogen in particular.

Cyclodextrin is a material that comprises cyclodextrins, i.e. oligosaccharides that are produced for example enzymatically from starch-containing raw materials such as corn or potatoes. Cyclodextrins have a ring-shaped, three-dimensional structure with a hydrophilic exterior and a lipophilic interior. This means that cyclodextrins form a hydrophobic interior space that is suitable for reversibly taking up a lipophilic molecule.

The filter unit presented is based on a filter material that comprises cyclodextrin, i.e. a large number of cyclodextrin molecules. Due to the cyclodextrin, the filter unit presented is able to bind lipophilic impurities in a hydrogen-containing fluid and, as a result, to clean the fluid of the lipophilic impurities. Accordingly, the filter unit is particularly advantageously suitable for cleaning fluid containing hydrogen that has been stored or transported using liquid organic hydrogen carriers. This means that the filter unit presented is suitable for providing pure hydrogen or hydrogen essentially free of impurities, in particular organic, non-polar impurities.

The filter unit presented may have any technically suitable form. In particular, the filter unit comprises a number of inlets, through which contaminated fluid can be supplied to the filter material, and a number of outlets, through which fluid that has been cleaned by the filter material can be discharged from the filter unit.

In particular, the filter unit presented can be optimized for pressure filling, i.e. a filling process in which contaminated fluid is fed into the filter unit at a pressure greater than atmospheric pressure. For this purpose, the filter unit can be cylindrical, for example, and/or have reinforcing structures that counteract bursting of the filter unit.

In particular, the filter unit presented can be a hydrogen tank having an inlet valve and an outlet valve.

The filter material of the filter unit can be in powder form, solid, in particular pressed, or in any other technically suitable form. For example, the filter material may be applied to a carrier material and/or moved or rearranged by a mechanism in the filter unit.

The filter unit comprises a filter element, such as a reactor, in which the filter material is stored and in which an interaction between a contaminated fluid and the filter material takes place. The filter element can be designed such that a contact surface for contact between respective contaminated fluid and the filter material is maximized or is maximal.

It may be provided that the filter material comprises at least one material from the following list of materials: alpha-cyclodextrin, beta-cyclodextrin, gamma-cyclodextrin, polymeric cyclodextrin, powdered cyclodextrin and pressed cyclodextrin.

In general, any form or mixture of cyclodextrins is suitable as a filter material, although a mixture containing a beta-cyclodextrin polymer has proven to be surprisingly efficient due to its particularly high cleaning performance. Of course, pure or essentially pure cyclodextrin, in particular beta-cyclodextrin polymer, is also suitable as filter material.

It may further be provided that the filter material comprises at least one material from the following list of materials in addition to the cyclodextrin: graphite, graphene, phthalocyanine, silica and foam ceramic.

By combining cyclodextrin with materials that have a particularly large surface structure, a contact surface between a fluid to be cleaned and the cyclodextrin can be maximized. For example, graphites, graphenes, phthalocyanines, silicates and/or foam ceramics coated with cyclodextrin may be used as the filter material of the filter unit presented.

It may further be provided that the filter unit comprises at least one interface for applying a vacuum.

By means of an interface for applying a vacuum, which is generated by a suction device, for example, the filter material of the filter unit presented can be subjected to the vacuum. Accordingly, the vacuum exerts a force on the filter material that causes impurities bound in the respective cyclodextrin molecules to be dissolved out of the cyclodextrin molecules, thereby allowing the cyclodextrin molecules to be reused to clean a contaminated fluid.

The interface for applying a vacuum may be, for example, a resealable opening or a valve in the filter unit, which has a flow connection to the filter material.

It may further be provided that the filter unit comprises at least one temperature control element for setting a temperature in the filter element.

By means of a temperature control element, such as a heater, in particular a heating coil or a heating circuit and/or a cooler, in particular a cooling circuit, a temperature can be set in the filter element and appropriately optimized for binding impurities to the cyclodextrin provided according to the invention.

In particular, a temperature in the filter element can be optimized by means of a temperature control element for a filtering process for filtering impurities or for a cleaning process for cleaning impurities from the filter material.

In a second aspect, the invention presented relates to a fuel cell system. The fuel cell system includes a fuel cell stack and at least one possible configuration of the filter unit presented. The at least one filter unit is arranged in a line for supplying a fluid to the fuel cell stack and is configured to clean the fluid of impurities.

The fuel cell system presented can be supplied with contaminated fluid due to the integrated filter unit. The contaminated fluid is cleaned by the filter unit and a fuel cell stack of the fuel cell system is accordingly operated efficiently and in a material-friendly manner.

It can be provided that the at least one filter unit acts as a pressure reducer and is configured to reduce a pressure at which the fluid flows onto the fuel cell stack to a predefined pressure.

The filter unit of the fuel cell system presented can, for example, be designed in such a way that a back pressure arises when fluid flows through the filter unit, in particular through the filter material. On the one hand, such a back pressure reduces an outlet pressure at which cleaned fluid flows out of the filter unit compared to an inlet pressure into the filter unit, in particular to a predefined value. On the other hand, such a back pressure may reduce a rate at which a fluid to be cleaned flows through the filter unit compared to an inlet rate into the filter unit, in particular to a predefined value, so that a minimum contact time between the filter material of the filter unit and the contaminated fluid and a corresponding minimum filter performance is ensured.

It can further be provided that the fuel cell system is a solid oxide fuel cell system or a membrane fuel cell system.

In a third aspect, the presented invention relates to the use of cyclodextrin for filtering a fluid for operating a fuel cell system.

In a fourth aspect, the presented invention relates to a method for operating a fuel cell system. The method comprises a provision step for providing at least one possible configuration of the presented filter unit on a fuel cell system and an operating step for operating the fuel cell system by conducting fluid for operating the fuel cell system to the at least one filter unit and conducting fluid cleaned by the at least one filter unit to a fuel cell stack of the fuel cell system.

The method presented can in particular be carried out continuously and ensure efficient and material-friendly operation of a fuel cell system.

It can further be provided that the method includes an application step for applying a vacuum to the at least one filter unit in order to clean the filter material of impurities, or a replacement step for replacing the at least one filter unit with at least one fresh filter unit or for conditioning the filter unit by replacing the filter element with a fresh filter element.

A particularly cost-effective operation of a fuel cell system can be made possible by cleaning a respective filter material.

By replacing a respective filter unit, a particularly long maintenance interval can be achieved when operating a fuel cell system.

Further advantages, features and details of the invention are apparent from the following description, in which working examples of the invention are described in detail with reference to the drawings. The features mentioned in the claims and in the description may each be essential to the invention individually or in any combination.

DETAILED DESCRIPTION

Figure 1:
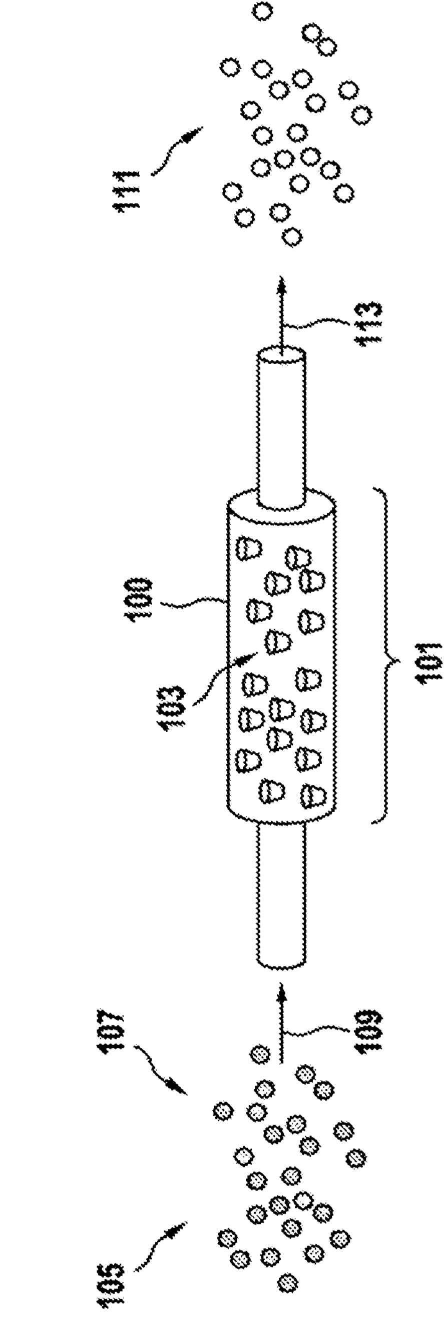
FIG. 1 a possible configuration of the presented filter unit.

A filter unit 100 is shown in FIG. 1. The filter unit 100 comprises a filter element 101 filled with filter material 103.

The filter material 103 consists at least partially of cyclodextrin. In particular, the filter material 103 may comprise alpha-cyclodextrin, beta-cyclodextrin, gamma-cyclodextrin, powdered cyclodextrin, polymeric cyclodextrin and/or pressed cyclodextrin. Additionally, the filter material may include graphite, graphene, phthalocyanine, silica and/or foam ceramic.

The filter unit 100 is used to filter or clean a fluid 105, in this case a hydrogen gas, which is contaminated with impurities 107, such as hydrocarbons.

To clean the contaminated fluid 105, the fluid 105 is conducted into the filter unit 100, as indicated by arrow 109.

The filter material 103, in particular the cyclodextrin in the filter material 103, absorbs the impurities 107 and allows cleaned fluid 111 to pass. Accordingly, the cleaned fluid 111 exits the filter unit 100 filtered, as indicated by arrow 113.

Figure 2:
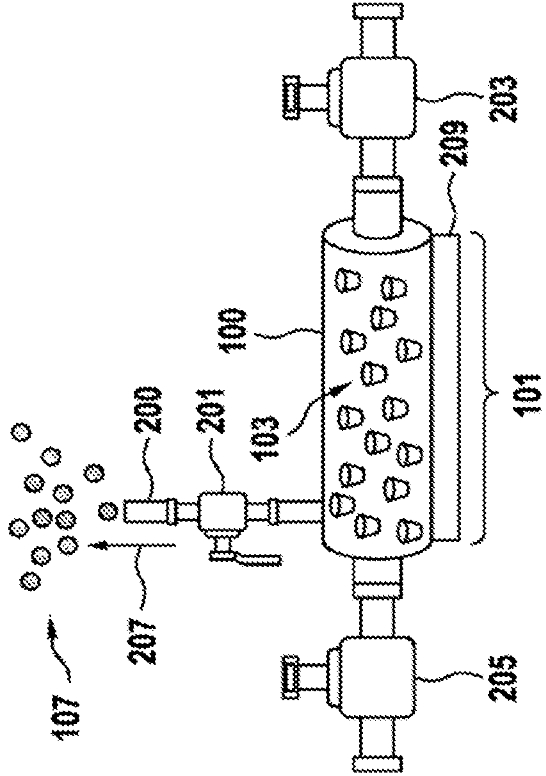
FIG. 2 the filter unit according to FIG. 1 with an interface for applying a vacuum, FIG. 3 a possible configuration of the presented fuel cell system, FIG. 4 a possible configuration of the method presented.

FIG. 2 shows the filter unit 100 with an interface 200 for applying a vacuum.

The cyclodextrin or cyclodextrin molecules of the filter material 103 are configured to reversibly bind the impurities inside their ring-shaped structure. Accordingly, cyclodextrin molecules containing impurities can be cleaned of the impurities 107 by a cleaning process, such as by applying a vacuum or negative pressure to the filter element 101, and used for renewed filtering of contaminated fluid 105. For this purpose, the interface 200 can be opened or closed via a valve 201 in order to allow a vacuum provided by an external suction device, for example, to act on the filter material 103.

Optionally, shut-off valves 203 and 205 may be provided, which may be closed when applying a vacuum at the interface 200, in order to maximize a suction effect of the vacuum on the filter material 103 and, accordingly, on the cyclodextrins, so that the impurities 107 may be released from the cyclodextrins and discharged from the filter unit 100, as indicated by arrow 207.

A temperature in the filter element 101 can be adjusted by means of an optional temperature control element 209 so that, for example, the filter material 103 or the cyclodextrins can be particularly readily separated from the bound impurities 107. For this purpose, the temperature control element 209 may comprise a heater and/or a cooler or can conduct heat energy provided by an external heater or cooling energy provided by an external cooler to the filter element 101 via a temperature control medium, such as water.

Figure 3:
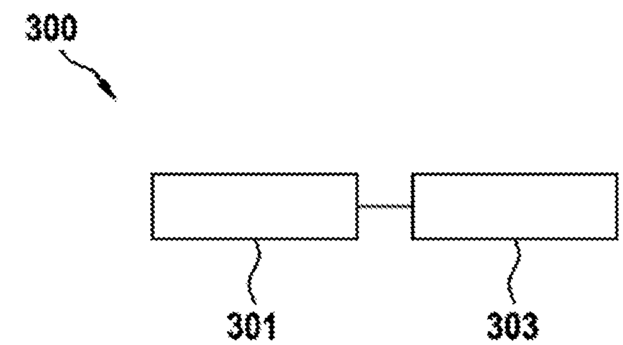

A fuel cell system 300 is shown in FIG. 3, which comprises a filter unit 301, such as the filter unit 100 shown in FIG. 1, and a fuel cell stack 303.

To operate the fuel cell system 300, a fluid containing hydrogen is fed from a pressure reservoir into the filter unit 301 and filtered through a filter material of the filter unit 301.

Accordingly, the filter unit 301 supplies cleaned fluid, i.e. pure hydrogen or substantially pure hydrogen, to the fuel cell stack.

Due to the physical properties of the filter unit 301, the filter unit 301 acts as a pressure reducer between the pressure reservoir and the fuel cell stack 303, so that a pressure reducing valve in the fuel cell system can optionally be dispensed with. In this case, for example, two or more filter units 301 can be arranged in series in order to set a predefined operating pressure for supplying the fuel cell stack 303 with operating fluid.

In particular, the fuel cell system 300 may be a solid oxide fuel cell system or a membrane fuel cell system.

Figure 4:
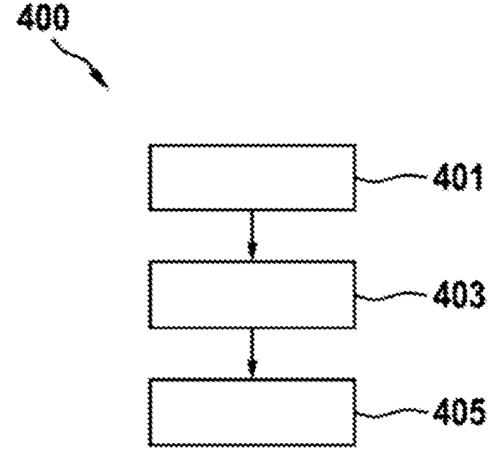

FIG. 4 shows a method 400. The method 400 comprises a provision step 401 for providing the presented filter unit to a fuel cell system and an operating step 403 for operating the fuel cell system by conducting fluid for operating the fuel cell system to the filter unit and conducting fluid cleaned by the filter unit to a fuel cell stack of the fuel cell system.

In an optional maintenance step 405, the filter unit can be cleaned by means of a vacuum or replaced by a fresh filter unit or conditioned with a fresh filter element.

What is claimed is:

1. A filter unit (100, 301) for filtering a fluid (105) for operating a fuel cell (303), wherein the filter unit (100, 301) comprises at least one filter element (101) filled with a filter material (103) which includes at least one cyclodextrin material and at least one temperature control element (209) comprising a heater and/or cooler and configured to adjust the temperature of the at least one filter element (101) to facilitate the impurities to be released from the at least one cyclodextrin material and discharged from the filter unit (100, 301), wherein the filter unit (100, 301) comprises at least one interface (200) communicating with the filter element (101) via a valve (201) and configured to apply a vacuum to the at least one filter element (101), and wherein the filter unit (100, 301) further comprises a first shut-off valve (203) positioned at an inlet of the filter unit (100, 301) and a second shut-off valve (205) positioned at an outlet of the filter unit (100, 301), the first and second shut-off valves (203, 205) being closed when the vacuum is applied at the interface (200) such that impurities are discharged from the filter unit (100, 301) through the valve (201).

2. A fuel cell system (300), wherein the fuel cell system (300) comprises:

a fuel cell stack (303), and at least one filter unit (100, 301) as claimed in claim 1, wherein the at least one filter unit (100, 301) is disposed in a line for supplying a fluid (105) to the fuel cell stack (303) and is configured to clean the fluid (105) of impurities (107).

3. The fuel cell system (300) as claimed in claim 2, wherein the at least one filter unit (100, 301) acts as a pressure reducer and is configured to reduce a pressure at which the fluid flows onto the fuel cell stack (303) to a predefined pressure.

4. The fuel cell system (300) as claimed in claim 2, wherein the fuel cell system (300) is a solid oxide fuel cell system or a membrane fuel cell system.

5. The filter unit (100, 301) as claimed in claim 1, wherein the filter material (103) comprises, in addition to the at least one cyclodextrin material, at least one material from the following list of materials: graphite, graphene, phthalocyanine, silica and foam ceramic.

6. The filter unit (100, 301) as claimed in claim 1, wherein the at least one temperature control element (209) contains a heater configured to heat the filter element and remove impurities captured by the at least one cyclodextrin material.

7. A method (400) for operating a fuel cell system (300), wherein the method (400) comprises the following steps:

providing (401) at least one filter unit as claimed in claim 1, and operating (403) the fuel cell system (300) by conducting fluid (105) for operating the fuel cell system (300) to the at least one filter unit (100, 301) and conducting fluid (111) cleaned by the at least one filter unit (100, 301) to a fuel cell stack (303) of the fuel cell system (300).

8. The method (400) as claimed in claim 7, wherein the method (400) further comprises:

applying a vacuum to the at least one filter unit (100, 301) to clean the filter material (103) of impurities (107), or replacing a filter element (101) of the at least one filter unit (100, 301) with a fresh filter element (101).

* * * * *